Oct. 24, 1944.  G. W. CARVEY  2,361,176
ARTICLE FEEDING APPARATUS
Filed Oct. 31, 1940  2 Sheets-Sheet 1
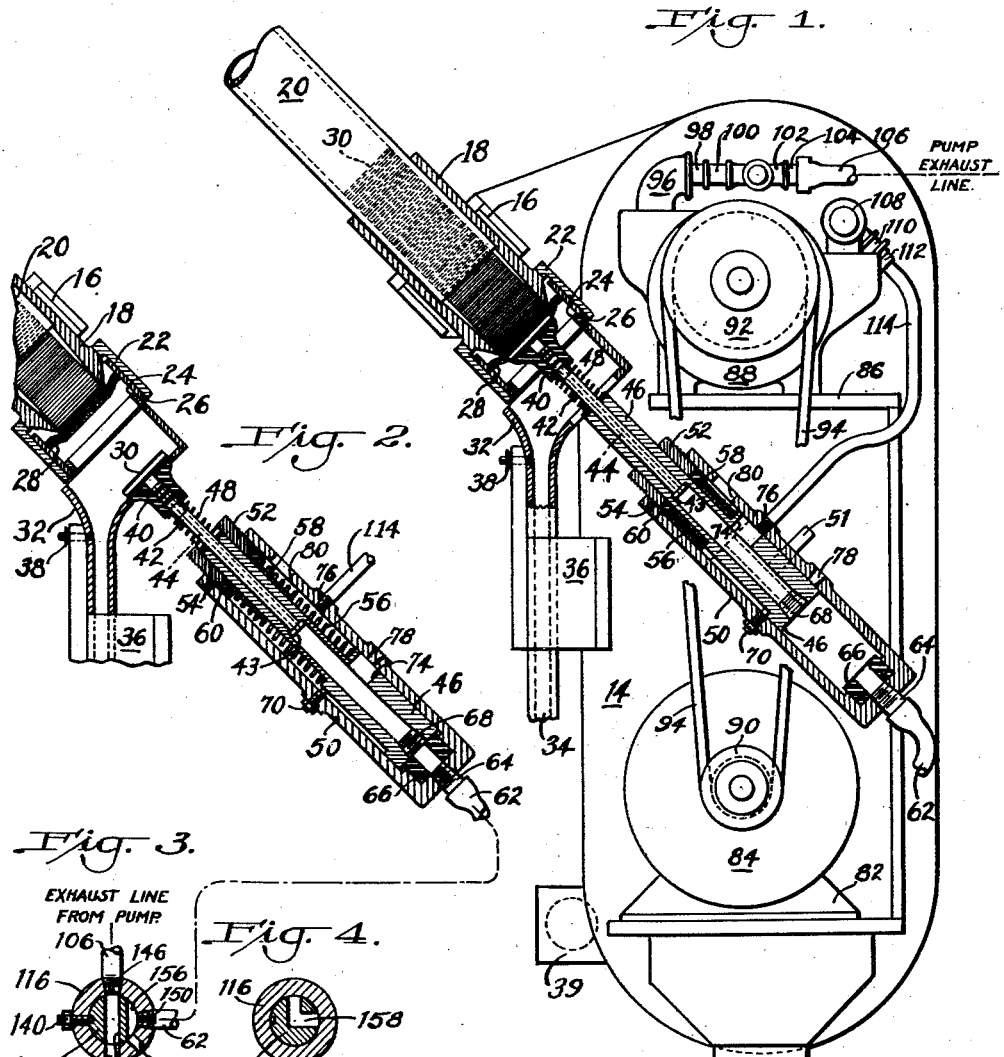
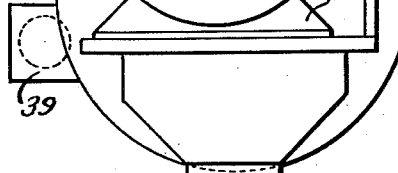
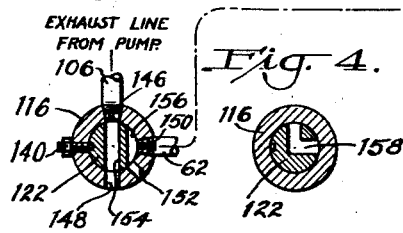
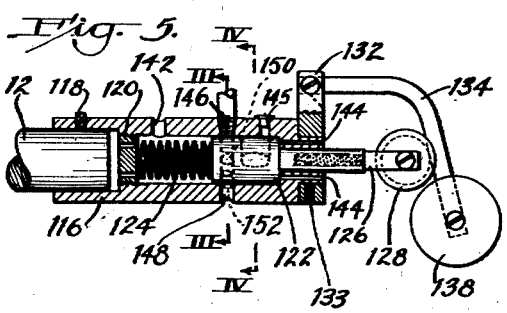
INVENTOR.
GEORGE W. CARVEY
BY
ATTORNEY.

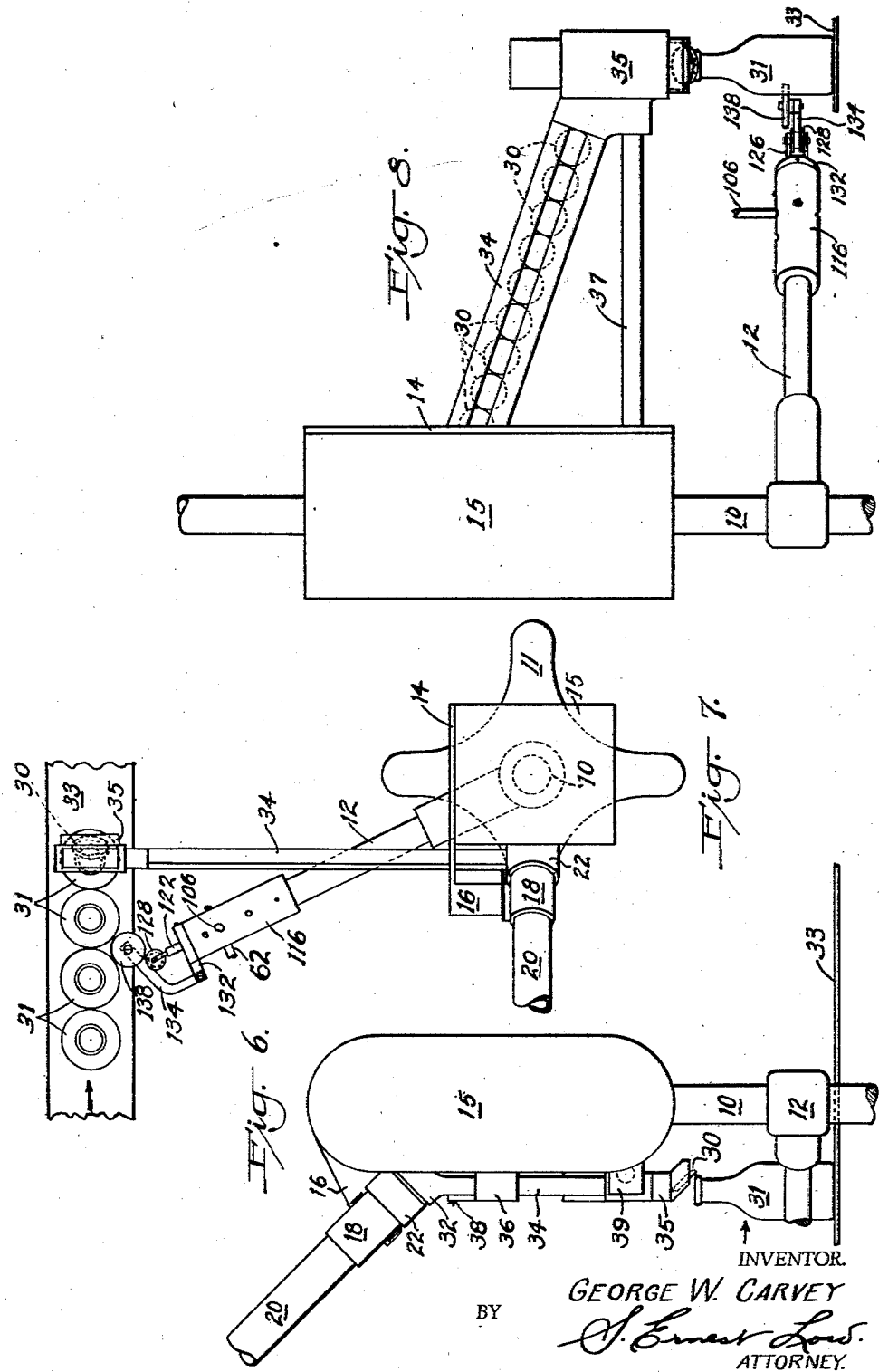

Patented Oct. 24, 1944

2,361,176

UNITED STATES PATENT OFFICE 2,361,176

ARTICLE FEEDING APPARATUS

George W. Carvey, Cheswick, Pa., assignor to Aluminum Company of America, Pittsburgh, Pa., a corporation of Pennsylvania Application October 31, 1940, Serial No. 363,621

2 Claims. (Cl. 226—88.1)

This invention relates to article feeding apparatus, particularly to apparatus for removing articles from a stack and delivering the same in a desired manner.

The invention particularly pertains to apparatus for one-by-one removal of preformed caps or closures from a magazine in which they may be retained in a stack, preferably in inverted, nested relationship, and the delivery of the same to a cap or closure feeding chute from which they may be deposited on or applied to the orifices of containers. The invention contemplates controlling apparatus of the aforementioned character in response to the movement of containers receiving caps so that the number of caps removed from the magazine and delivered to the feeding chute is proportionate to the number of containers.

The invention contemplates the handling of caps of relatively thin fragile metal foil, or caps of paper or the like, which are easily crushed, distorted, mutilated, or torn. Since caps of the above character must be carefully handled, many objects of the invention may be expressed with a view to the avoidance of unnecessary injury thereto. However, the invention is not confined, nor are its objects confined, merely to the handling of caps of such character, but rather the invention contemplates the provision of apparatus for efficient handling of rigid caps, and other articles, as well.

It is an object of this invention to provide apparatus for one-by-one removal of articles from a magazine and delivery thereof to a position spaced therefrom. It is further an object to provide apparatus of this character which is capable of rapid operation without injury to the articles being so handled.

It is an object to provide apparatus for removing articles one-by-one from a stack and delivering them through a feeding chute to a discharging station. It is particularly an object to provide apparatus for removing fragile caps one-by-one from a magazine in which they are held in nested relationship and delivering the caps through a feeding chute to a device for applying the caps to the orifices of containers.

A further object of the invention is the provision of an apparatus, for removing successive caps from a magazine and delivering them through a chute to containers, which is operable in response to movement of each container.

It is particularly an object to control the supply of caps delivered to a cap applying station so that it will be proportionate to the number of containers receiving caps at the cap applying station, without having any control device in contact with the caps being fed to the cap applying station, it being desirable to avoid any unnecessary contact of moving parts with the caps being fed.

Another object of the invention is to provide means for stopping, starting, and feeding caps with reference to the supply of containers whereby, on the failure of the supply of containers, the removal of caps from the magazine will be stopped, but there will yet be sufficient caps in the delivery chute to provide for the closing of containers then passing through or by the apparatus.

Further objects and advantages will be readily ascertainable from the following description and drawings. In the drawings:

Figure 1 is an elevation of an apparatus embodying the invention, parts being broken away to facilitate illustration and the article feeding apparatus per se being shown in cross section;

Figure 2 is a cross section of the article feeding apparatus per se shown in Figure 1 with the parts in different relative positions;

Figure 3 is a section taken on the line III—III of Figure 5 showing ports in the operating valve;

Figure 4 is a section taken on the line IV—IV of Figure 5 likewise showing a port in the operating valve;

Figure 5 is a cross section of the operating valve showing the valve lever and associated parts;

Figure 6 is an elevation of the apparatus shown in Figure 1 but with the cover in place;

Figure 7 is a plan of the apparatus shown in Figure 6; and

Figure 8 is a side elevation of the apparatus shown in Figure 6.

The preferred form of article feeding apparatus shown in the drawings is adapted to the removal of caps from a magazine and the delivery thereof through a chute to a cap applying device. The apparatus comprises generally a cap magazine disposed in a vertical plane approximately at a 45° angle of elevation having a throat at the lower end thereof through which successive caps may be withdrawn. There is provided in the throat a means for retaining the stack of caps in the magazine which permits one-by-one removal thereof. Opposite the throat of the cap magazine and therebelow is the entry portion of a cap feeding chute. The cap feeding chute is disposed generally in a vertical plane which is preferably perpendicular to the aforesaid vertical plane passing through the inclined axis of the cap magazine and leads downwardly away from the throat of the cap magazine. The cap feeding chute terminates in a cap applying device which delivers caps onto the orifices of bottles passing thereunder in a horizontal direction.

For removing the caps from the magazine and depositing them in the cap feeding chute there is provided a "cap picking" or "cap pulling" apparatus, the active element of which is a suction cup mounted on a reciprocable tube. This tube is reciprocated by a piston in an operating cylinder. During the cap engaging stroke and part of the cap withdrawing stroke of the suction cup, suction is produced therein by the connection of the suction cup through its operating tube and piston with the intake side of a pump. A valve is provided for controlling the operating cylinder. This valve is provided with an operating lever disposed in the path of bottles passing by the cap applying device.

The apparatus shown in the drawings will now be particularly described. A main support column 10 is mounted on a pedestal 11 (shown in Figure 7) to carry a valve support rod 12, to be hereinafter referred to, and a main frame 14 preferably thereabove. As shown in Figures 6, 7, and 8, the main frame 14 carrying much of the internal mechanism of the device may be provided with a suitable cover 15. However, in Figure 1, this cover is removed to expose the internal mechanism.

Referring particularly to Figure 1, a magazine supporting bracket 16 extends outwardly from the main frame 14, being integral therewith at an upper portion. This bracket 16 has secured thereto by suitable cap screws or the like, not shown in the drawings, a magazine throat 18, which has its axis disposed at an angle of elevation of about 45°. This magazine throat is preferably a hollow cylinder, the internal surface thereof for a portion of its length being of cylindrical contour for the reception of a cylindrically shaped magazine or cap supply tube 20. The lower portion of the internal surface of the magazine throat 18 forms a shoulder supporting the magazine 20 and is inwardly tapered toward the lower extremity thereof, thus producing a slightly conical contour for the guiding of the caps to be fed therethrough. The magazine throat 18 is of circular cross section for the handling of circularly shaped articles. Of course, other contours may be selected to suit articles of other shapes.

For retaining articles in the magazine 20 and magazine throat 18 for one-by-one removal, there is provided an article retaining device. This device includes a sleeve 22 suitably secured around the lower portion of the magazine throat 18 and extending axially thereof below its lower end. Within the sleeve 22, a ring 24 is provided to secure a retaining spring insert 26. Suitable securing means, not shown, may be employed for removably fastening the retaining spring insert 26 between the ring 24 and the sleeve 22. Insert 26 is a sleeve-like member provided for supporting internally thereof a plurality of article retaining springs 28. These springs are directed radially inward of the insert 26 adjacent the lower extremity of the magazine throat 18. Thus, it will appear that, at the base of the magazine throat 18, displaceable retaining springs 28 form an escapement device for retaining articles in the magazine 20 and magazine throat 18 which are adapted to permit one-by-one removal of the articles while retaining the remainder of the articles thereabove.

In the embodiment of the invention shown in Figure 1 and Figure 2, the magazine or supply tube 20 is shown partially filled with preformed caps 30 suitable for the closing of containers such as milk bottles. The caps 30 are disposed in the magazine 20 and magazine throat 18 in inverted, nested relationship. Reference is made to the patent to Sharp et al. No. 1,796,729, issued March 17, 1931, for a more complete disclosure of a cap such as the caps 30 herein shown. Of course, other types of caps or other articles could be readily accommodated by the mechanism herein described.

Immediately below the sleeve 22 and in axial alignment with the magazine throat 18, there is disposed the entry portion 32 of a cap feed chute 34. The entry portion 32 is shaped to conform generally to the cylindrical shape of the magazine 20 and magazine throat 18, and at a lower corner is bell mouthed from the main portion of the feed chute 34. At the lower end of the entry portion 32 opposite the magazine throat 18 an aperture is provided for the passage therethrough of a cap withdrawing device which will be hereinafter described. The cap feed chute 34 is adjustably secured at its upper end to a bracket 36 mounted on the main frame 14. The bracket 36 has a slotted portion through which a suitable wing nut 38 adjustably secures and positions the entry portion 32 of the feed chute 34. The manner of supporting the remaining portion of the feed chute 34 will be hereinafter described.

For withdrawing caps 30 one at a time from the magazine throat 18, there is provided a suction cup 40 preferably made of rubber or like material. The suction cup 40 is mounted on the end of an operating tube 42 having an axial passage 44 therethrough terminating in an axial passage through the suction cup 40. The operating tube 42 is slidably secured within a centrally bored portion of a piston 46 in an operating cylinder 50. The operating tube 42 is prevented from sliding axially out of the piston 46 in the direction of the suction cup by a flanged portion 43 at the end thereof within the piston 46. The operating tube 42 is adapted to slide to a limited extent into the piston 46, and a coiled spring 48 is provided between the base of the suction cup 40 and the outer extremity of the piston 46 for cushioning inward movement of the suction cup 40 and operating tube 42 relative to piston 46 and for tending to maintain the suction cup 40 at its outward position relative to the piston 46. The aforedescribed manner of mounting the suction cup and its operating tube 42 in the piston 46 is provided so that, when the suction cup is brought into engagement with the lowermost cap 30 in the magazine throat 18, over-travel of the piston 46 may be had without unnecessarily disturbing the stack of caps 30, yet insuring sufficient and adequate pressure of the suction cup 40 on the lowermost cap 30.

The suction cup 40 is reciprocated to and from the lowermost cap 30 in the magazine throat 18 from and to the entry portion 32 of the feed chute 34 through the movement of the piston 46 in its operating cylinder 50. The operating cylinder 50 is mounted by suitable fastening means, not shown, on a bracket 51 secured to main frame 14. The piston 46 is in sliding contact with the internal surface of the cylinder 50 throughout the lower portion of its length. At the suction cup end of the operating cylinder, a reduced portion of the piston 46 slidably passes through an externally threaded nut 52 received within the outer end of the operating cylinder 50. The nut 52, when adjusted properly, is secured in place by a suitable set screw 54.

Surrounding the upper, reduced portion of piston 46 is a coiled spring 56 bearing at one end on a shoulder of the piston and at the other end on a spring seat 58 abutting against a rubber bumper block 60 immediately beneath the adjustable nut 52. The spring 56, it will thus appear, is adapted to urge the piston 46 in a downward direction and to move the same in that direction for downward movement of the suction cup 40. Upward movement of the piston 46 is adapted to be effected by the supply of air under pressure to the operating cylinder 50 at the lower end thereof through a pressure hose 62 and coupling 64 secured in the base of the cylinder 50. Upward motion of the piston 46 is limited by the abutment of the shouldered portion of the piston 46 against axially extending portions of the spring seat 58, as shown in Figure 1. The rubber bumper block 60 is adapted to cushion the final arresting of the upward motion of the piston 46. Downward movement of the piston 46 is arrested by a rubber bumper block 66 in the lower end of cylinder 50, as shown in Figure 2. The central bore through the piston 46 hereinabove described is closed at the lower end of the piston 46 by means of a suitable plug 68. The piston 46 is secured against rotation in the cylinder 50 by a suitable set screw 70 having its inner end projecting within a suitable slotted way in the outer surface of the piston 46.

The passage 44 through the operating tube 42 for the suction cup 40 terminates in the enlarged central bore of the piston 46, which is closed at its lower extremity as aforesaid by the plug 68. In order to effect a suitable connection of the vacuum cup 40 with a suction producing apparatus during portions of the cycle of movement of the suction cup 40, a port 74 is provided in the side of the piston 46. This port is adapted to register with a suitable port 76 in the cylinder 50 when the piston is in the uppermost position (see Figure 1), and with a similar port 78 in the cylinder 50 when the piston 46 is in the lowermost position (see Figure 2). A further port 80 is provided in the upper portion of cylinder 50 to permit communication between port 76 and the atmosphere when the piston 46 is in the lowermost position.

From the above description it will be seen that the piston 46 is adapted to be urged upwardly by the application of air pressure through the pressure hose 62 and coupling 64 in the base of cylinder 50. And likewise the piston 46 is adapted to be urged downwardly by the coiled spring 56. The apparatus for supplying air under pressure to the operating cylinder 50 and for producing suction in the suction cup 40 may now be described.

Mounted on a suitable base 82 secured to the main frame 14 is a suitable motor 84. Mounted on a similar base 86 secured to the main frame 14 at the upper portion thereof is a suitable pump 88. Pulleys 90 and 92 on the motor 84 and pump 88, respectively, are connected by a belt 94 for driving the pump 88 from motor 84. The exhaust or pressure side of the pump 88 is connected through an elbow 96, bushing 98, nipple 100, T 102, and nipple 104 to a pressure hose 106. The pressure hose 106 forms the pump exhaust line which is adapted to be connected through a valve, to be hereinafter described, with the pressure hose 62, above mentioned. The intake or suction side of the pump 88 is connected through a T 108, bushing 110, and nipple 112 to a suction hose 114, which is connected at its opposite extremity to the port 76 in the cylinder 50. At the end of T 108 not appearing in the drawing (Figure 1) a suction balancing valve is preferably provided, which may be adjusted to balance the air intake to pump 88 with that which it attempts to exhaust.

As has been described, when the piston 46 is in its uppermost position, as shown in Figure 1, the intake side of the pump 88 is in communication with the suction cup 40 through the pressure hose 114, port 76, port 74, central bore of piston 46 and passage 44 through operating tube 42. When the piston 46 is in its lowermost position, as shown in Figure 2, the intake side of the pump 88 is in communication with the atmosphere through the aforementioned pressure hose 114, port 76, and port 80, communication between port 76 and port 80 being established around the reduced portion of piston 46. It will thus appear that suction is produced on suction cup 40 only during the uppermost portions of upward and downward movement thereof defined by the periods during which the ports 74 and 76 are in partial or complete registry. Vacuum in the suction cup is not released, however, until the port 74 registers with the port 78, which, in the embodiment of the invention here shown, communicates directly with the atmosphere. If it were desired, however, the port 78 could be connected with the exhaust side of the pump 88 in order to positively produce pressure in the suction cup 40 to insure removal of the cap 30 therefrom.

The suction cup 40 on its operating tube 42 and piston 46 is caused to move upwardly and then downwardly in the manner hereinabove described in response to the operation of a control valve 116, shown particularly in Figure 5. This control valve 116 is mounted on the end of the valve support rod 12 and is secured thereto by means of a set screw 118. The end of the control valve 116 adjacent the valve support rod 12 is internally closed by means of a suitable externally threaded nut 120. Disposed within the control valve 116 is a valve piston 122 having a reduced extremity thereof extending axially through the outer end of the valve 116. Between the externally threaded nut 120 and the valve piston 122, there is disposed a suitable coiled spring 124 adapted to urge the valve piston toward the outer end of the valve 116. A suitable clevis 126 is mounted in the reduced stem extending from the end of the valve piston and carries at the extremity thereof a valve roller 128 secured therein by means of a suitable pin. Surrounding the valve 116 at the outer end thereof is a yoke support 132, secured by a set screw 133, for supporting a valve operating lever 134. The valve operating lever 134 is pivotally mounted in the support 132 by means of a suitable pin, and at its extremity carries a valve lever roller 138. The valve lever 134 bears against the valve roller 128 and is adapted to urge the valve piston 122 inwardly against the coiled spring 124. When no pressure is exerted on the valve lever roller 138, the coiled spring 124 is adapted to return and hold the valve piston 122 outwardly. A suitable set screw 140 is provided in one side of the valve 116, having its inner end projecting within a suitable slotted way in the outer surface of the valve piston 122 to secure the same against rotation in valve 116.

The valve 116 is provided with a port 142 near the externally threaded nut 120 and with ports 144 through the end thereof surrounding the reduced portion of valve piston 122, for the escape of air when the valve piston 122 moves in one or the other direction. A lubricating orifice 145 is shown in valve 116 near yoke support 132. Approximately centrally of the valve 116, there is provided a port 146 therein and diametrically opposite thereto another port 148 therein, both vertically disposed. In approximately the same transverse plane, there is provided in valve 116 a port 150 intermediate between the ports 146 and 148, at 90° from each and horizontally disposed, and a port 152 intermediate between the ports 150 and 148, at 45° from each and thus disposed at a 45° angle of depression from the horizontal.

Near its inner end, the valve piston 122 is provided with a diametrical, vertical port 154 passing therethrough and adapted, when the valve piston is in its outermost position, to establish communication between ports 146 and 148 of the valve 116. There is likewise provided in the same transverse plane as the port 154, a chordal port 156 in valve piston 122 parallel to the port 154 adapted, when the valve piston is in its outermost position, to establish communication between the ports 150 and 152 of the valve body 116. The aforementioned ports are all shown in registry, as described in Figure 3.

Near its outer end, the valve piston 122 is provided with a port 158 extending radially downward parallel to the port 154 to the center of the valve piston 122 and then, at right angles thereto, radially outward. This port 158, when the valve piston 122 is in its innermost position, is adapted to establish communication between the ports 146 and 150 of the valve body 116, and to close off any communication to or through the remaining ports. The port 158 is shown in Figure 4, but not in registry with the other ports.

The operating valve 116 is interconnected with the operating cylinder 50 and the pump 88 by connecting the pump exhaust line, i. e., pressure hose 106, with the port 146, and by connecting the cylinder pressure hose 62 with the port 150. It will thus appear that, when there is no object pressing the valve lever roller 138 and the valve lever 134 inwardly, the valve piston will be in its outermost position, shown in Figure 5. In such position, communication will be established between the exhaust side of the pump 88 and the atmosphere through the ports 146, 154, and 148. Further, the cylinder 50 will be in communication with the atmosphere by means of the connection through the pressure hose 62, and ports 150, 156, and 152. The position of the control valve piston 122, shown in Figure 5 and Figure 3, corresponds to the position of the piston 46 in the operating cylinder 50, shown in Figure 2. It will be readily understood that, when the port 158 of the valve piston 122, shown in Figure 4, assumes the position of the ports 154 and 156, shown in Figure 3, pressure will be directly applied to the piston 46 in the cylinder 50.

Returning to Figures 6, 7, and 8, the apparatus may be more fully described with reference to its preferred use. In these figures the apparatus hereinabove described in detail is applied to the feeding of caps from the magazine 20, through the aforementioned apparatus, into the feed chute 34, and to a cap applying device 35 at the end thereof. The feed chute 34 is supported at the end adjacent the cap applying device by means of a bracing rod 37 connected to a suitable bracket 39 on the main frame 14.

The cap applying device 35 is adapted to receive the caps by gravity from the feed chute 34 and dispose them on the orifices of containers 31 here shown as passing thereunder on a conveyor 33. The cap applying device 35 is not here shown or described in detail since it may take any convenient form well known in the art. Reference is particularly made to the patent to Sharp et al. No. 2,096,346, issued October 19, 1937, wherein a cap applying device, such as the device 35 here mentioned, is fully disclosed, illustrated, and explained. It is sufficient to point out that such a cap applying device is adapted to apply or deposit one cap therefrom on the orifice of each container as it is passed thereunder.

For purposes of illustration, the conveyor 33 is a simple horizontal line conveyor adapted to move the bottles or containers 31 at right angles to the plane of the feed chute 34. The conveyor could take any form or position desired, suitable rearrangement of the feed chute 34 and valve 116 being permissible within the scope of the invention.

The control valve 116, mounted on the valve supporting rod 12, is so positioned as to dispose the valve lever roller 138 partially in the path of the containers 31. The control valve is so positioned in order that its valve piston 122 may be operated to and from the position shown in Figure 5 as each container 31 passes thereby. By this arrangement the control valve 116 is operative to cause the suction cup 40 to remove one closure 30 from the magazine throat 18 for each bottle or container 31 passing the control valve 116.

The operation of the apparatus may be briefly summarized as follows. As a container 31 on conveyor 33 passes the valve lever roller 138, it moves the valve lever 134 to press upon the valve roller 128 and move the valve piston 122 inwardly. Inward motion of the valve piston 122 disposes the port 158 (see Figure 4) thereof in position to connect pressure from the pump 88 to the operating cylinder 50. Immediately thereupon the piston 46 is moved upwardly to push suction cup 40 upwardly against the lowermost cap 30 in the magazine throat 18. As the port 74 of the piston 46 comes into coincidence with the port 76 of the operating cylinder 50, suction is produced on the suction cup 40 and a vacuum is created between the suction cup 40 and the lowermost cap 30, thus causing said cap to adhere to the suction cup.

Thereafter, as the container 31 passes sufficiently beyond the valve lever roller 138, the valve lever 134 and roller 138 are permitted to move outwardly. The coiled spring 124 pushes the valve piston 122 and valve roller 128 to so move the valve lever 134. Thus, the valve piston 122 moves outwardly to establish communication of the exhaust side of the pump 88 with the atmosphere and of the operating cylinder 50 with the atmosphere. Immediately thereupon the return spring 56 in the operating cylinder 50 moves the piston 46 downwardly from the magazine throat 18 pulling the lowermost cap 30 from the stack of caps 30. As the port 74 of the piston 46 passes the port 76 of the operating cylinder 50, further vacuum is not created in the suction cup 40.

However, when the port 74 of the piston registers with the port 78 of the operating cylinder 50, the vacuum will be immediately relieved. It will thus appear that at the completion of the cycle of the suction cup 40, the cap 30 will be free thereof and permitted to fall into the feed chute 34. This is a complete cycle of operations and is a cycle established in response to the presence and the motion of a container 31.

In Figure 7 the control valve 116 has been shown in position to sense the passage of containers 31 before they reach the cap applying device 35. It will, of course, be readily appreciated that the control valve 116 could be placed anywhere in the path of movement of containers 31 so as to sense the containers 31 before, during, or after their passage under the cap applying device 35. It is preferred, of course, to employ the control valve 116 reasonably near the cap applying device 35 and preferably on the side thereof preceding the cap applying operation.

The invention has been herein described as embodied in a cap feeding apparatus, but it will be readily apparent that it has utility in other forms of article feeding apparatus coming within its scope.

What is claimed is:

1. A cap feeding apparatus comprising a cap magazine, means for retaining a stack of caps in said magazine, a cap feeding chute adjacent said magazine for delivering caps to moving containers, a suction cup for engaging and withdrawing successive caps from said magazine and delivering the same to said chute, an operating cylinder and piston for actuating said suction cup, a motor, a pump driven by said motor, means for operatively connecting the exhaust side of said pump with said cylinder, said piston in said cylinder being connected to said suction cup and adapted to be driven in at least one direction by pressure from the exhaust side of said pump, means for operatively connecting the intake side of said pump with said suction cup to produce suction during portions of its cycle of movement, said pump intake connecting means including a port in said cylinder, a port in said piston, and a passage through said piston connecting said piston port with said suction cup, whereby the suction cup is energized in response to the movement of the piston, and means for actuating said pump exhaust connecting means in response to the movement of the aforesaid containers receiving caps from said chute.

2. A cap feeding apparatus comprising a cap magazine, means for retaining a stack of caps in said magazine, a cap feeding chute adjacent said magazine for delivering caps to moving containers, a suction cup for engaging and withdrawing successive caps from said magazine and delivering the same to said chute, an operating cylinder and piston for actuating said suction cup, a motor, a pump driven by said motor, means for operatively connecting the exhaust side of said pump with said cylinder, said piston in said cylinder being connected to said suction cup and adapted to be driven in at least one direction by pressure from the exhaust side of said pump, means including a passage through said piston to said suction cup for operatively connecting the intake side of said pump with said suction cup to produce suction during portions of its cycle of movement, and means for actuating said pump exhaust connecting means in response to the movement of the aforesaid containers receiving caps from said chute.

GEORGE W. CARVEY.